UNITED STATES PATENT OFFICE.

LEOPOLD LITYNSKI, AUGUST RODAKIEWICZ, AND FELIKS KUROWSKI, OF LEMBERG, AUSTRIA-HUNGARY.

COMPOSITION FOR FIREPROOFING WOOD.

SPECIFICATION forming part of Letters Patent No. 650,689, dated May 29, 1900.

Application filed December 1, 1898. Serial No. 698,014. (No specimens.)

*To all whom it may concern:*

Be it known that we, LEOPOLD LITYNSKI, AUGUST RODAKIEWICZ, and FELIKS KUROWSKI, citizens of the Empire of Austria-Hungary, residing at Lemberg, in the Empire of Austria-Hungary, have invented certain new and useful Improvements in Impregnating Compounds for Fireproofing Vegetable Matter; and we do hereby declare the following to be a full, clear, and exact description of the invention.

This invention relates to an impregnating compound for fireproofing wood, textile fabrics, paper-pulp, straw, and similar inflammable vegetable matter, the object being to provide a cheap and efficient compound of this character.

This compound consists, essentially, of a solution of potassium carbonate and boracic acid in combination with a solution of basic magnesium carbonate and boracic acid obtained by the addition of ammoniacal salts.

The use of potassium carbonate as a fireproofing ingredient is well known; but the use in combination of boracic acid and potassium carbonate, whereby potassium borate is formed to some extent, is not known and has a far better effect. In consequence thereof the percentage of potassium carbonate, which must be very high when employed alone and has an injurious effect on fabrics, can be considerably reduced without impairing the fireproof properties of the fabric thus treated. An addition of from one to three per cent. of boracic acid to from eight to twelve per cent. of potassium carbonate may suffice by way of example. This mixture has, moreover, the advantage of having preserving and antiseptic properties not possessed by the potassium carbonate alone and which are of great importance for the treatment of wood. In order to still further reduce the percentage of potassium carbonate and of boracic acid, and thus render the process still less expensive, the addition of magnesium carbonate containing some boracic acid is subsequently made, this mixture or compound having strong fireproofing properties and not having been previously discovered. The process is carried on by adding to a solution of magnesium sulphate a corresponding volume of a solution of potassium carbonate or of soda while subsequently adding a quantity of an ammoniacal salt, preferably ammonium sulphate, sufficient to dissolve the precipitate of basic magnesium carbonate formed. A small quantity only is needed for this purpose. The addition of the ammoniacal salt, the fireproofing properties of which are well known, is not used on account of such properties, as the small quantity used would scarcely have any appreciable effect. Moreover, such properties are inferior to those of potassium carbonate and boracic acid and to those of magnesium carbonate and boracic acid; but this addition is resorted to in order to render the magnesium carbonate soluble by the aid of a chemically-inert factor. Then from one to two per cent. of boracic acid is dissolved in the liquid, and this solution is mixed in suitable proportions with that of the potassium carbonate and boracic acid. A very satisfactory impregnating fluid consists of two compositions, the first of which consists of five hundred grams of water, one hundred and thirty to one hundred and forty grams of potassium carbonate, and ten grams of boracic acid well mixed and added to a second composition consisting of five hundred grams of water, forty grams of magnesium sulphate, ($MgSO_4$,) twenty-five grams of potassium carbonate, ($K_2CO_3$,) twenty grams of ammonium sulphate, $(NH_4)_2SO_4$, and ten grams of boracic acid.

It is obvious that the percentage of the various component ingredients must vary according to the nature of the material treated, the latter being soaked in the finally-prepared solution and subsequently dried. For woody material it is necessary to remove the sap previously in a manner well known to experts.

We claim as our invention—

A composition of matter for impregnating inflammable materials to render same fireproof, consisting of a solution of water, potassium carbonate and boracic acid, in the proportions substantially as specified, mixed with a solution of water, magnesium sulphate, potassium carbonate, ammonium sulphate, and boracic acid, all in substantially the proportions hereinbefore set forth.

In witness whereof we have hereunto set our hands in presence of witnesses.

LEOPOLD LITYNSKI.
AUGUST RODAKIEWICZ.
FELIKS KUROWSKI.

Witnesses as to signatures of Leopold Litynski and Feliks Kurowski:

JACOB ADRIAN,
ALVESTO S. HOGUE.

Witnesses as to signature of August Rodakiewicz:

ERNST KAUFMANN,
AUGUST FUGGER.